United States Patent [19]

Pano

[11] Patent Number: 4,492,140
[45] Date of Patent: Jan. 8, 1985

[54] ROTARY SLOT CUTTING TOOLS HAVING REPLACEABLE INSERTS AND REPLACEABLE SEATS

[75] Inventor: Joseph Pano, Shavey-Zion, Israel
[73] Assignee: Iscar Ltd., Nahariya, Israel
[21] Appl. No.: 385,173
[22] Filed: Jun. 4, 1982
[51] Int. Cl.³ .............................................. B27B 33/08
[52] U.S. Cl. ........................................ 83/839; 407/46
[58] Field of Search .............................. 83/838–845; 407/72, 33, 46, 51, 52

[56] References Cited

U.S. PATENT DOCUMENTS

| | | | |
|---|---|---|---|
| 108,059 | 10/1870 | Smith | 83/839 |
| 151,043 | 5/1874 | Miller | 83/839 |
| 303,787 | 8/1884 | Arnold | 83/839 |
| 435,556 | 9/1890 | Chase | 83/842 |
| 455,169 | 6/1891 | Chase | 83/842 |
| 558,338 | 4/1896 | Andrews | 83/842 |
| 3,590,893 | 7/1971 | Burkiewicz | 83/838 |

*Primary Examiner*—James M. Meister
*Attorney, Agent, or Firm*—Ladas & Parry

[57] ABSTRACT

A rotary slot cutting tool arrangement is described in which a disc-shaped body has a plurality of peripherally disposed recesses. Each recess is adapted to have a seat self-locked therein. The seat in turn is capable of having a cutting insert inserted into it as well as removed therefrom, without the seat having to change its position with respect to the body itself.

9 Claims, 5 Drawing Figures

ROTARY SLOT CUTTING TOOLS HAVING REPLACEABLE INSERTS AND REPLACEABLE SEATS

FIELD OF THE INVENTION

This invention relates in general to rotary cutting tools and more particularly to rotary cutting tools for slotting purposes such as rotary saws.

BACKGROUND OF THE INVENTION

Such rotary tools are used either to cut slots in solid materials or for cutting off portions of the materials by cutting through the material. The rotary tools comprise discs with centrally keyed mounting apertures and having peripherally disposed cutting elements. Originally the cutting elements were an integral part of the disc. When the cutting element wore out or broke the entire tool had to be replaced. To obviate the need for replacing the entire tool, recesses were cut in the periphery of the saw disc or saw blade to be used to receive replaceable teeth. Various methods and apparatus were used for properly attaching the teeth to the disc. An early patent showing a saw blade having a disc-like body with replaceable blades in peripheral recesses is French Pat. No. 88481 to M. Arnold which issued in January 1870.

It was later determined that in many cases, as the replaceable cutting insert broke when hitting an obstacle such as a harger material in the workpiece, the disc also was damaged. Thus, the problem remained of having to exchange the expensive disc if one or two of the replaceable inserts hit an obstacle and caused damage to the disc.

Thus, the problem remained of having to exchange the expensive disc if one or two of the replaceable inserts hit an obstacle and caused damage to the disc.

To overcome this problem the replaceable cutting insert was attached to a seat and larger recesses were cut into the periphery of the rotary disc for receiving the seat and an integral cutting insert. An example of this solution to the problem is shown in French Pat. No. 1,280,280 which issued to Lennartz and Co. in Nov. 28, 1960.

The replaceable seats for solving the problem of preventing a disc cracking or breaking is relatively new. However, seats on shanks have been used for receiving cutting inserts in saw blades since the 1870's. In the early patents the seats were used primarily as a means for locking the replaceable insert into the rotating disc.

An example of such use is a U.S. Pat. No. 151,043 which issued on May 19, 1874 to W. P. Miller. That patent teaches the use of a spring tempered steel seat arrangement for holding cutting inserts into recesses in the periphery of a rotating saw. A shank-like seat is slightly larger than the recess in the disc and is of tempered steel so that when the seat is forced into a recess it compresses and secures the cutting insert in place. The shank-like seat of the Miller device only extends into the recess until the shoulder of the shank-like seat abuts a shoulder abutting portion of the outer periphery of the disc.

In the Miller device there are combinations of forces acting on the shoulder abutting portion. For example, there are the counter forces to the compression forces of the resilient shank that act on the shoulder abutting portion. In addition the cutting forces act on the shoulder abutting portion. The combination of forces can damage the disc. Thus, in spite of the replaceable shank-like seat and insert there still remains a great likelihood of damage to the disc itself.

Other prior art devices for holding replaceable blades in place are shown in patents such as U.S. Pat. No. 207,121 which issued to Van Drake on Nov. 7, 1882. In that patent the replaceable disc or cutting insert is held in place in a recess on the periphery of the saw disc by a resilient arcuate shim member. In Van Drake arrangement there are tremendous forces on the periphery of the disc including the cutting forces and the reactive resilient forces.

In a U.S. Pat. No. 320,798 to Smith which issued on Sept. 22, 1885, resilient replaceable cutting inserts are held in place using a seat in a peripheral recess plus a resilient shim. An embodiment taught in the Smith patent merely uses resilient cutting inserts. The necessary resiliency of the cutting insert makes it impossible to use materials such as carbide.

The U.S. Pat. No. 455,169 to Chase, which issued on Jan. 30, 1891, shows a replaceable insert held against the body by a unique block or holder consisting of a semicircular segmental piece designed to turn into an arcuate groove in the recess for receiving the replaceable cutting insert. Note that the "holder" is not really a "seat" and thus the problems of needing to replace the entire disc if the seat fractures, remains.

The U.S. Pat. No. 542,577 to Walter which issued on July 9, 1895 shows an arcuate holder for holding a replaceable cutting insert or saw tooth within the body of the disc or saw. Therein the disc body takes the strains exerted on the tooth plus the reactive resilient strains and there is no seat protection.

The known prior art teaches replaceable cutting inserts with varied apparatus and systems for securely holding the replaceable cutting inserts in the saw body or disc. All of the known prior art teaches either integral seats and cutting edges or seating systems where the clamping forces for holding the cutting insert on the seat depends on the clamping of the seat in the body.

BRIEF DESCRIPTION OF THE INVENTION

Accordingly it is an object of the present invention to provide new and unique rotary cutting tools in which the above-referred to problems and disadvantages are substantially reduced or overcome and the above-referred to features are substantially obtained. According to the present invention an improved rotary cutting tool arrangement is provided, said cutting tool arrangement comprising:

a disc-shaped body, a plurality of peripheral recesses on said body, replaceable seats characterized to self-lock into said recesses, replaceable cutting inserts, and means independent of the locking forces between said body and said seat for lockingly receiving said insert on said seat.

A feature of the invention comprises wedge means for self-locking said seat into said discs.

According to a feature of the invention the replaceable seat has tail means and a plurality of arcuate sides, two of said arcuate sides meshing against opposed arcuate sides of said recess whereby said seat slides on said arcuate edges while said tail jams into a tongue defined groove which is part of said recess.

Yet another feature of the invention utilizes the tongue as a stop for positioning said replaceable seat in said recess.

Yet another feature of the invention utilizes the shape of the tail with respect to the shape of the tongue whereby the forces of the cut extending through the replaceable seat are absorbed by the main disc-shaped body rather than by the relatively narrow tongue.

BRIEF DESCRIPTION OF THE DRAWINGS

The operation and utilization of the present invention will become more apparent from the description of a preferred embodiment of the invention taken in conjunction with the accompanying drawings, in which.

GENERAL DESCRIPTION OF THE INVENTION

Figure 1:
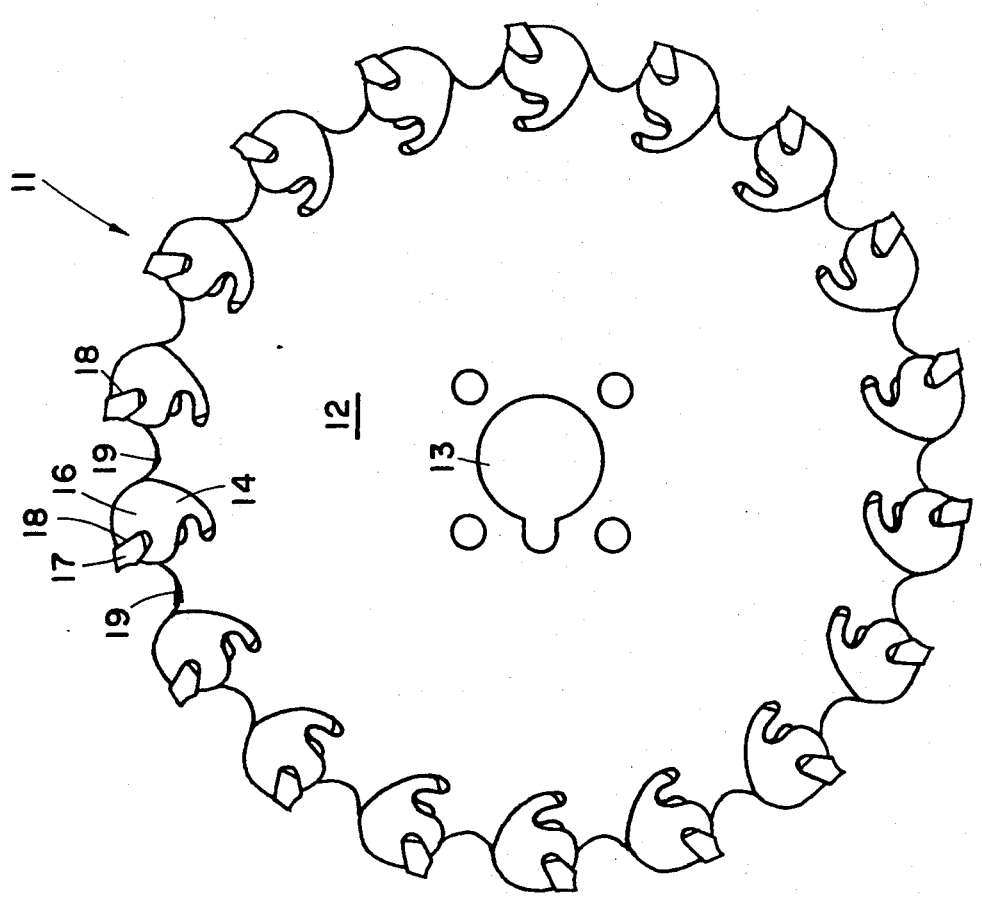
FIG. 1 is a plan view of an embodiment of the invention including a disc with replaceable seat and replaceable cutting inserts peripherally mounted on the disc-like body.

In FIG. 1 a preferred embodiment of the rotary cutting tool having replaceable seats and replaceable cutting inserts is shown generally at 11. The cutting tool comprises a disc-like main body 12 having an indexible mounting hole 13 therein. The mode of indexible mounting is not important to the scope of the invention. However, tools of this kind may have some kind of indexible mounting means. The disc 12 has a plurality of peripheral recesses at the outer edge thereof such as recess 14 into which a replaceable seat 16 is placed. The replaceable seat 16 holds securely therein a replaceable cutting insert 17. The inserts are securely retained in the seats in the noted application without any clamps or fastener means therein due to the wedge-shape of the insert and the wedge-shape of the recess 18. The space at the periphery of the disc between the replaceable seats is arcuately shaped and forms a valley such as valley 19 designed for receiving the chips of material from the article being machined.

Figure 2:
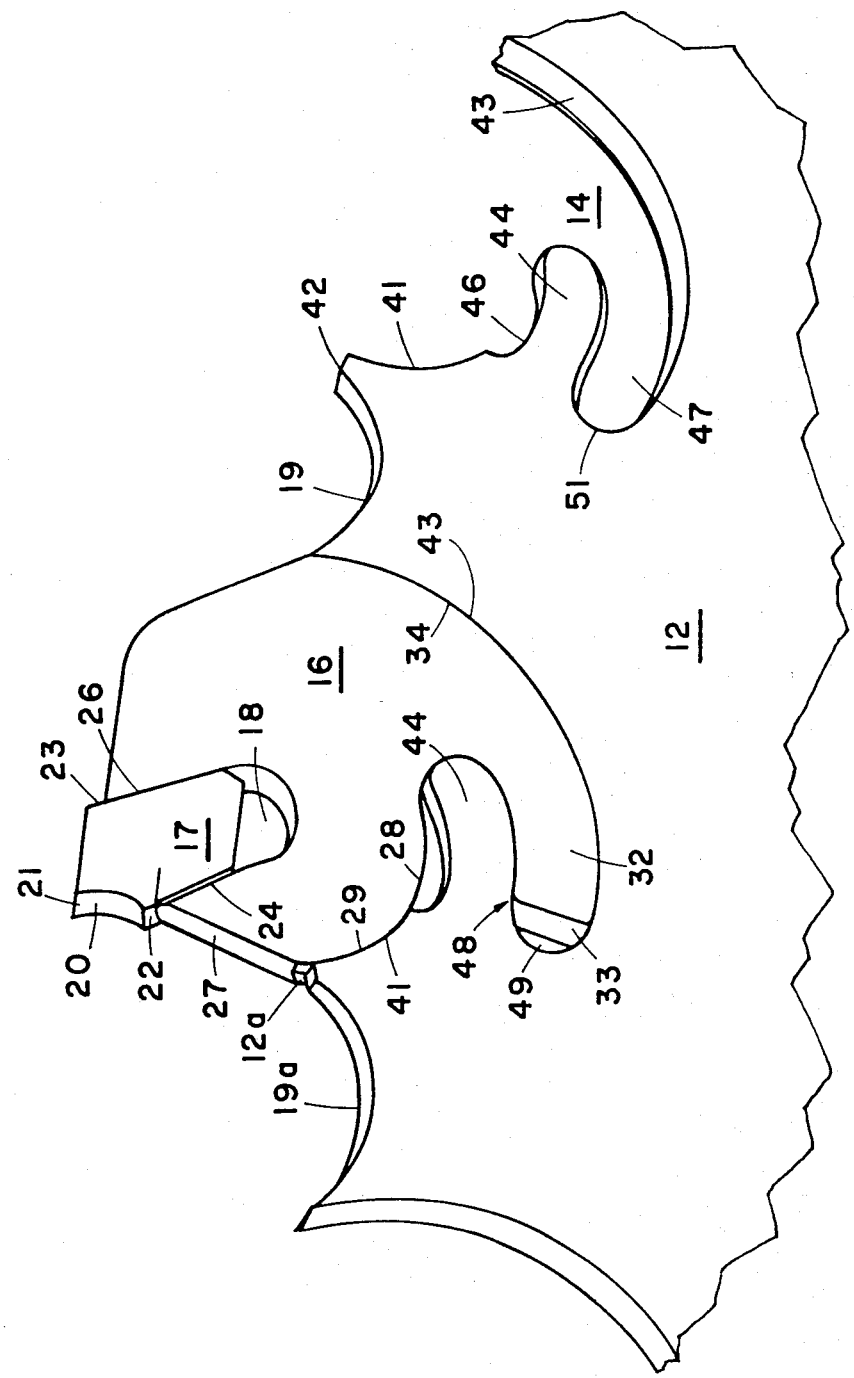
FIG. 2 is a pictorial showing of a section of the disc of FIG. 1 with a replaceable seat and a replaceable cutting insert mounted thereon.
Figure 5:
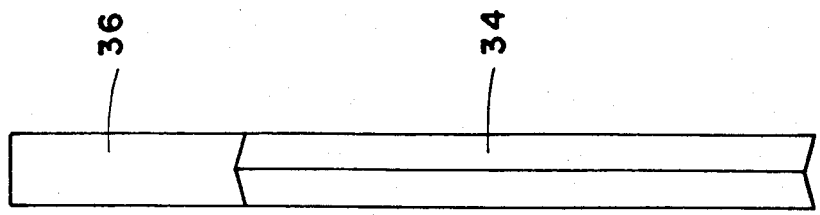
FIG. 5 is a rear view of the replaceable seat of FIG. 1.
Figure 3:
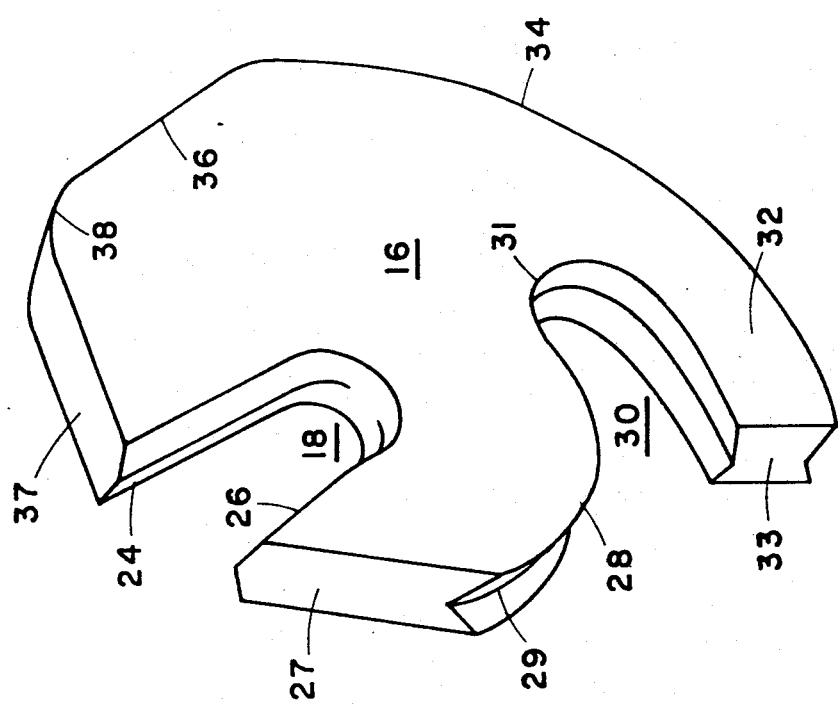
FIG. 3 is a pictorial showing of the replaceable seat of FIG. 1.
Figure 4:
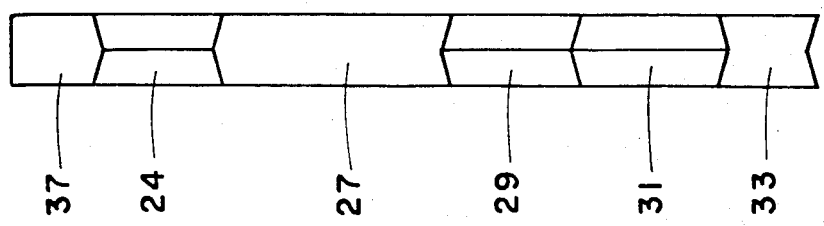
FIG. 4 is a front view of the replaceable seat of FIG. 1.

The shapes of the characterized replaceable seat and characterized recess in the disc-like tool body for the replaceable seat is best seen in FIGS. 2 and 3. Therein, for example, the cutting insert is shown as having a cutting edge 21 extending outwardly from the wedge-like body defined by spaced apart angled sides 22 and 23. The angled sides 22 and 23 abut angled sides 24 and 26, respectively of the recess 18 in the replaceable seat 16.

The chips separated from the article being machined follow the contour of surface 20 and a leading surface 27 of the seat. Leading surface 27 leads to valley 19a of the disc-like body 12.

As best seen in FIGS. 2 and 3 the surfaces of the sides 24 and 26 of the recess 18 are prismatic to mesh with the prismatic surfaces on the sides 22 and 23 of the replaceable cutting insert. Means are provided for enhancing the grip between the replaceable seat and the insert. More particularly the meshing surfaces are shown as prismatic. The biased lead surface 27 which is an extension of the valley 19a terminates at an arcuate section 28 of the seat 16. The interior wall 29 (FIG. 3) of the arcuate section 28 of the seat 16 is also prismatic and meshes with the prismatic surface integral to the disc-like body. As seen in FIG. 3 the convex arcuate section 28 terminates in a concave arcuate portion 31. The concave portion 31 extends to a tail-like section 32. The tail-like section 32 has a relatively flat, but slightly pointed end section 33.

The bottom of the tail is also an arcuate section 34 which terminates in a diagonal wall 36 that intersects with another diagonal wall 37. The intersection point of the diagonal walls 36 and 37 forms an obtuse angle. However, the intersection is rounded at 38. The recess 14 as seen in FIG. 2 is shown as having a leading arcuate wall 41 which serves as a pivoting location for arcuate section 28.

The recess 14 has an arcuate wall 41 at its leading section. The arcuate wall 41 is removed from valley 19 by a relatively flat portion 42. An arcuate wall 43 defines the lagging section of the recess immediately prior to the next valley. A tongue 44 extends into the recess in a peninsular fashion. A section 46 is cut from arcuate section 41 to provide a clearance between the tongue 44 and the arcuate section 28 of the replaceable seat.

As best seen in FIG. 2 a tongue defined groove 47 receives the tail 32 of the seat 16 in a securing and locking fashion. Thus for example, the groove and tail are both wedge-shaped with the tail 32 dimensioned slightly larger than the groove 47. Thus the tail wedge-locks the replaceable seat into the recess. The main locking forces however are exerted by the tail 32 along the portion of the tongue 44 at 48 where the tongue joins with the main body section of the disc-like body 12. The flattened end 33 of the tail leaves a space 49 between groove portion 47. This space enables using a tool to remove the replaceable seat 16 when desired.

The machining forces exerted on the replaceable insert 17 and consequently on the replaceable seat 16 cause the seat 16 to pivot at surfaces 29 against surface 41 and at surface 34 against body surface 43. In pivoting the seat is lodged securely into the wedge-locking groove 47 and therefore requires a tool in the space 49 for removal of the seat. Note that the seat locks in place without any clamps or fasteners. Further note that the tongue 44 acts as a definite stop in the pivoting motion of the seat and thus aids in securing and replaceably setting the seat into the disc-like body of the tool. The arcuate surface 28 has nearly the same center point as the arcuate surface 34 enabling the replaceable seat 16 to be "cam-locked" tighter and tighter as the seat slides on the two previously mentioned surfaces when it is set into the disc-like body of the tool.

Among the advantages of the described rotary tool with replaceable seat and cutting inserts is that the parts making up the tool are self locking, lock in place without the necessity of resiliency and thus the parts can be made from non-resilient materials, if so desired. Also because the parts are not held at the top of the disc-like body the recesses and consequently the cutting inserts can be placed very close to each other thereby speeding up the cutting process. Also the harder parts enable the use of thinner tool elements to thereby enable the machining of thinner slots.

In operation a tool with a disc-like body 12 (FIG. 1) and having a plurality of peripheral recesses 14 thereabout is selected. Replaceable seats 16 are placed into the recesses. Replaceable inserts, such as replaceable insert 17 are fitted into the appropriate recesses in the replaceable seats. The disc-like body with the cutting inserts therein is mounted on a machine tool and the operation commenced. Special tools are used, for example between the insert 17 and the seat 16 to remove the insert and at space 49 to remove the replaceable seat when it is necessary to replace these parts.

The seat is held securely in the disc-like body without any clamps or fasteners. The portions doing the actual holding are not at the periphery of the disc-like body and do not require resiliency for causing the seat to maintain its secure hold on the cutting insert. Accordingly a rotary cutting tool is shown which is especially useful for large rotary saws for example, wherein the cutting inserts are replaceable and the seats are replaceable. The replaceable parts can be hardened so that the thickness dimension of these parts can be minimized. In addition the number of cutting inserts can be maximized.

While the principles of the invention have been described above in connection with specific apparatus and applications, it is to be understood that this description is made by say of example only and not as a limitation on the scope of the invention.

What we claim is:

1. An improved rotary cutting tool arrangement, said cutting tool arrangement comprising:
    a disc-shaped body,
    a plurality of peripheral recesses on said body,
    replaceable seats each configured to self-lock into one recess due only to locking forces between said body and said seat,
    replaceable cutting inserts, and
    means independent of the locking forces between said body and said seat for lockingly inserting and locking said insert to said seat, without relative motion between said body and said seat.

2. The improved rotary cutting tool arrangement of claim 1 including:
    wedge-shaped slots in said replaceable seats for lockingly receiving said replaceable cutting inserts,
    said recesses including integral tongue means extending from said body into said recess to define a body groove, and
    tail means on said seat characterized to aid in locking said seat into said recess.

3. A disc-shaped rotary cutting tool having replaceable seats for receiving replaceable cutting inserts,
    said disc-shaped tool having peripheral recesses for receiving said seats,
    tongue means extending into said recesses to define a body groove,
    tail means on said seat to lockingly fit into said body groove for aiding in locking said seat to said disc-shaped tool, whereby each seat is self-lockable in its recess to said body and is further characterized by the absence of motion between it and said body, when an insert is insertable or removable therefrom.

4. The rotary tool of claim 3 wherein said seat comprises a first arcuate section meshing with a leading arcuate wall defining said recess, and
    a lagging arcuate section meshing with a lagging arcuate wall further defining said recess.

5. The rotary tool of claim 4 wherein said tongue means of said disc-shaped body and said lagging arcuate section define a tail receiving groove for receiving tail means on said seat.

6. The tool of claim 5, wherein said tail means has a flattened end so as not to extend to the end of the groove, said space between the flattened tail and the end of the groove useable for a tool for removing said replaceable seat.

7. The tool of claim 5 wherin said tongue means has a top section that provides space between said body and said replaceable seat and a back section being formed by a discontinuation of the leading arcuate walls defining said recess.

8. A disc-shaped rotary cutting tool having replaceable seats for receiving replaceable cutting inserts,
    said disc-shaped tool having peripheral recesses for receiving said seats,
    said seats having a first arcuate section meshing with a leading arcuate wall defining said recess, and a lagging arcuate section meshing with a lagging arcuate wall further defining said recess,
    tongue means extending into said recesses to define a body groove,
    tail means on said seat configured to lockingly fit into said body groove for aiding in locking said seat to said disc-shaped tool,
    said tongue means of said disc-shaped body and said lagging arcuate section defining a tail receiving groove for receiving said tail means on said seat,
    said tail means having a flattened end so that as not to extend to the end of the groove, said space between the flattened tail and the end of the groove being useable for a tool for removing said replaceable seat.

9. A disc-shaped rotary cutting tool having replaceable seats for receiving replaceable cutting inserts,
    said disc-shaped tool having peripheral recesses for receiving said seats,
    said seats having a first arcuate section meshing with a leading arcuate wall defining said recess, and a lagging arcuate section meshing with a lagging arcuate wall further defining said recess,
    tongue means extending into said recesses to define a body groove, said tongue means having a top section that provides space between said body and said replaceable seat and a back section being formed by a discontinuation of the leading arcuate walls defining said recess,
    tail means on said seat configured to lockingly fit into said body groove for aiding in locking said seat to said disc-shaped tool,
    said tongue means of said disc-shaped body and said lagging arcuate section defining a tail receiving groove for receiving said tail means on said seat.

* * * * *